US008638958B2

(12) United States Patent
Wells

(10) Patent No.: US 8,638,958 B2
(45) Date of Patent: Jan. 28, 2014

(54) SPEAKER SHOES WITH AUDIO ADAPTER RECEIVER

(76) Inventor: John Andrew Wells, Paradise Valley, AZ (US)

( * ) Notice: Subject to any disclaimer, the term of this patent is extended or adjusted under 35 U.S.C. 154(b) by 481 days.

(21) Appl. No.: 12/802,733

(22) Filed: Jun. 14, 2010

(65) Prior Publication Data

US 2011/0305357 A1 Dec. 15, 2011

(51) Int. Cl.

| | |
|---|---|
| ***H04R 5/02*** | (2006.01) |
| ***H04B 3/00*** | (2006.01) |
| ***H04R 9/06*** | (2006.01) |
| ***H04R 1/02*** | (2006.01) |
| ***A43B 23/00*** | (2006.01) |

(52) U.S. Cl.
USPC ............. 381/301; 381/80; 381/333; 381/388; 36/139

(58) Field of Classification Search
USPC ........... 381/77, 79–81, 333, 334, 2, 300, 301, 381/311, 385, 386, 388, 394, 395
See application file for complete search history.

(56) References Cited

U.S. PATENT DOCUMENTS

| | | | | |
|---|---|---|---|---|
| 5,345,700 | A | 9/1994 | Norment | |
| 5,461,188 | A | 10/1995 | Drago et al. | |
| 6,608,907 | B1 * | 8/2003 | Lee | 381/311 |
| 7,412,294 | B1 * | 8/2008 | Woolfork | 700/94 |
| 7,623,078 | B2 | 11/2009 | Wang | |
| 8,161,664 | B1 * | 4/2012 | Dawson | 36/54 |
| 2006/0132314 | A1 * | 6/2006 | Sok | 340/573.1 |
| 2008/0044052 | A1 * | 2/2008 | Whipple | 381/376 |
| 2008/0167741 | A1 * | 7/2008 | Lay et al. | 700/94 |
| 2009/0151043 | A1 * | 6/2009 | Moreshead | 2/69 |
| 2009/0288317 | A1 * | 11/2009 | Forbes | 36/136 |

FOREIGN PATENT DOCUMENTS

WO PCT/US06/45746 11/2006

OTHER PUBLICATIONS

Reviews.cnet.com/mp3-players/dada-footwear-code-m/4505-64p1, CNET editors's review, Troy Dreier, Dada Footwear Code M/BBS, pp. 1-3.

jr.com/audioengine/pe/Aug_AWI, Audioengine W1 (AWI)—Premium Wireless Audio adapter in Computer Cable Adapters and Switches, pp. 1-2.

(Continued)

*Primary Examiner* — Ping Lee
(74) *Attorney, Agent, or Firm* — Eugene H. Eickholt

(57) ABSTRACT

A music playing system employing the combination of mini-speaker footwear wirelessly receiving music from a music source (20) external to the footwear using an audio adapter transmitter (13) connected to the music source (20) to wirelessly transmit music to an audio adapter receiver (9) mounted in the footwear is disclosed. A rechargeable lithium-ion polymer battery pack (10) is hidden in a shoe compartment (19). This battery pack powers the speakers (1-4) in the footwear and the audio adapter receiver (9). The external music source (20) may for example be but not limited to an iPod, iPhone, iPad, iPad 3G, iPod nano, iPod Shuffle, iPod Touch, iPad Tablet, smart phone, Droid phone, Android phone, MP3 player, CD player, microchip player or computer. Power for the audio adapter transmitter (13) is provided by the battery power pack of the external music source.

12 Claims, 11 Drawing Sheets

(56) References Cited

OTHER PUBLICATIONS whatsoniphone.com/blogs/accessory-review-audioengine, Audioengine AW2 Accessory Review—Audioengine AW2 Wireless adapter for iPod, pp. 1-4.
Audioengine W2 Premium Wireless Adapter for iPod (Plus other Apple Touch Devices, p. 1-5, http://www.memlane.com/?product=audioengine-w2-premium-wireless-adapter-for-ipod.
Appletell reviews the Audioengine W2 wireless music adapter for iPod,pp. 2-3 of 9, http://www.technologytell.com/apple/44206/appletell-reviews-the-audioengine-w2/, Jan. 19, 2009.
Christopher Breen,Audioengine W1 Wireless Audio Adapter, p. 1-3, Apr. 14, 2008, http://www.pcworld.com/article/144519/article.html.
Audioengine W3 (W3) Premium Wireless Audio Adapter (set), p. 1-4 http://www.audiolab.com/Audioengine_W3_W3_Premium_Wireless_Audio_Adapter_p/a.

* cited by examiner

SPEAKER SHOES WITH AUDIO ADAPTER RECEIVER

FIELD OF INVENTION

The present invention to musical footwear incorporates mini-speakers and an audio adapter receiver located on the footwear. A rechargeable battery power source concealed in a hidden compartment in the sole of the footwear powers the mini-speakers and receiver.

BACKGROUND OF THE INVENTION

The desirability of playing music from small speakers such as mini-speakers on footwear such as shoes or boots is well known. Placing various music sources in the shoe such as an MP3 player, recordable microchip, integrated memory device or microprocessor with a ROM memory have been proposed. This placement exposes these expensive components to damage from dirt, water and shock from hard pounding when the foot wearer is engaged in for example a running activity. The present invention avoids these drawbacks by use of hand held devices having audio playing capabilities to serve as the music source.

The shoe mounted speakers work with any iPod, iPhone, iPad, iPad 3G, iPad nano, iPad Shuffle, iPod Touch, iPad Tablet, MP3 player, CD player, microchip player or computer to play music aloud at high volumes. Other examples of music sources include smart phones, Droid phones and HTC EVO 4G Android phones. One known product is the Dada Code M basketball shoes featuring built-in speakers in each shoe. A MP3 player having prerecorded sound tracks from a Macintosh or Windows computer is embedded in the sole of the right shoe. The MP3 player serving as the music source wirelessly sends music to the left shoe's speaker or to a speaker headset. The Code M shoes have limited battery life and only 128 MB storage capacity.

Some users reported a tinny sound when the shoe speakers were played and interference and signal dropout at times when using the speaker headset.

The following U.S. patents found in a prior art search were considered related:

| U.S. Pat. No. | INVENTOR | ISSUED |
|---|---|---|
| 5,345,700 | Norment | 13 Sep. 1994 |
| 5,461,188 | Drago et al | 24 Oct. 1995 |
| 7,623,078 | Wang | 24 Nov. 2009 |

U.S. Pat. No. 5,345,700 Norment discloses an integral unitary assembly slipped into a side pocket of a shoe. The assembly includes an audio speaker, battery and microchip which can be activated to play a musical composition.

U.S. Pat. No. 5,461,188 Drago et al discloses a sound system incorporated into articles of clothing such as shoes. The system plays preprogrammed music in one embodiment using a memory circuit which can be reprogrammed for new music programs. The shoes in one embodiment may display light patterns to illuminate in synchrony with the rhythmic beat of either an internal or external music or sound program. In one embodiment each shoe has a system interlinked using a wireless data-link transmitting circuit to control sound and light emanating from the shoes.

U.S. Pat. No. 7,623,078 Wang discloses a plug-in antenna adapter for use with hand held portable devices. In one embodiment a compact portable wireless pedometer is placed in the sole of a runner's shoe to wirelessly transmit information to the portable device using the antenna adapter to receive information on how many steps a runner is taking. The adapter may be used to provide wireless transmit and receive functions for various audio and visual devices including cellular telephones, wireless media players, wireless cellular headsets, audio headphones, wireless speakers and hand held computers.

Also found in the prior art search was PCT Application PCT/US06/45746 (Lay et al) which discloses a data system having an electronic module in a shoe sole's shank member. The electronic module includes a microprocessor in electronic communication with a data storage device, a rechargeable battery, a decoding device to convert digital data to analog data and a wireless data link. Each shoe has audio speakers for playing sounds generated by the data storage device. The rechargeable battery supplies power to the electronic module and to the speakers. A USB port is provided in the rear heel of the shoe to permit battery recharging and to input data such as MP3 music program files to a ROM chip within the data storage device. In one embodiment a wireless link is used in both shoes to send data from the first shoe to the second shoe to enable stereo music to be played. In another embodiment the wireless link is used to send music to a headset for private listening enjoyment.

SUMMARY OF THE INVENTION

It is the primary object of the present invention to enable hand held portable devices such as those mentioned above to wirelessly transmit sound signals such as music to mini-speakers mounted in footwear such as shoes or boots. Cloud-based music heard through speaker shoes may be enjoyed for example by use of a hand held iPad 3G. What cloud-based music does is it allows music purchased to be stored on record label servers, allowing them to stream anytime. This removes the need for large storage at home. The songs are still saved on the iPad 3G so as to be accessible when internet connectivity is not available. As compared with the prior art devices, use of a sound source external to the footwear greatly reduces the weight while increasing the comfort of speaker mounted footwear. Some users of the present invention may save money by using already owned hand-held devices. It is a further object of the present invention to house up to four speakers in each shoe whereby eight speakers total in a pair of shoes may create a loud amplified sound.

It is another object of the present invention to enable the speakers to play music wirelessly whereby use of cords connecting the speakers to the hand held portable devices are eliminated.

It is a further object of the present invention to use a plug-in audio adapter transmitter compatible with the above mentioned hand held portable devices in conjunction with an audio adapter receiver placed in the footwear.

It is a further object of the present invention to power the mini-speakers and audio adapter receiver using a slim power pack such as a rechargeable lithium-ion polymer battery hidden in the sole of the footwear. It is a further object of the present invention to provide a USB power port in the rear heel of the footwear to enable recharging of the battery.

It is yet a further object of the present invention to minimize the size and weight of the audio adapter receiver, battery and mini-speakers so as to be suitable for use in many types of athletic shoes. Examples of footwear include but are not limited to basketball shoes and in-line rollerblade skates.

A further object of the present invention is to provide a shoe-mounted speaker source which does not block the ears of the wearer so as not to create a safety hazard.

It is a further object of the present invention to provide quality music sounds of up to 100 feet free of static, noise, signal dropout and interference.

It is a further object of the present invention to provide in each shoe such an arrangement that is stylish, simple, inexpensive and easy to use.

In accordance with the teachings of the present invention, there is disclosed a mini-speaker footwear system not requiring a special shoe mounted music source. The system uses an audio adapter transmitter to wirelessly transmit audio or sound signals generated by hand held devices such as for example an iPod, iPhone, iPad, iPad 3G, iPod nano, iPod Shuffle, iPod Touch, iPad Tablet, smart phone, Droid phone, Android phone, MP3 player, CD player, microchip player or computer to the footwear's mini-speakers. Use of a quality light weight lithium-ion polymer battery power source ensures longer music playing time. The battery power source is rechargeable through a small USB power port in the footwear's heel. The system uses modified footwear having multiple mini-speakers for stereo sound and high-definition stereo sound. The footwear is further modified to have a concealed compartment in the sole of the footwear to securely house the battery power source, a wireless audio adapter receiver and mini-speaker wiring harness from harmful dirt and water.

Additionally, it is a prime object of the invention to encapsulate a battery pack and a modular audio adapter receiver in a protective rubberized polymer capsule. This ensures waterproofing and offers cushioning comfort placed under the inner shoe sole.

In accordance with the teachings of the present invention, there is also disclosed a method of employing a variety of audio playing hand-held devices as the source for wirelessly transmitting sound signals to the footwear's mini-speakers.

Other objects and advantages of the present invention will become apparent from the subsequent detailed description of the preferred embodiments and the appended claims taken in conjunction with the accompanying drawings.

DETAILED DESCRIPTION OF THE INVENTION

Figure 1:
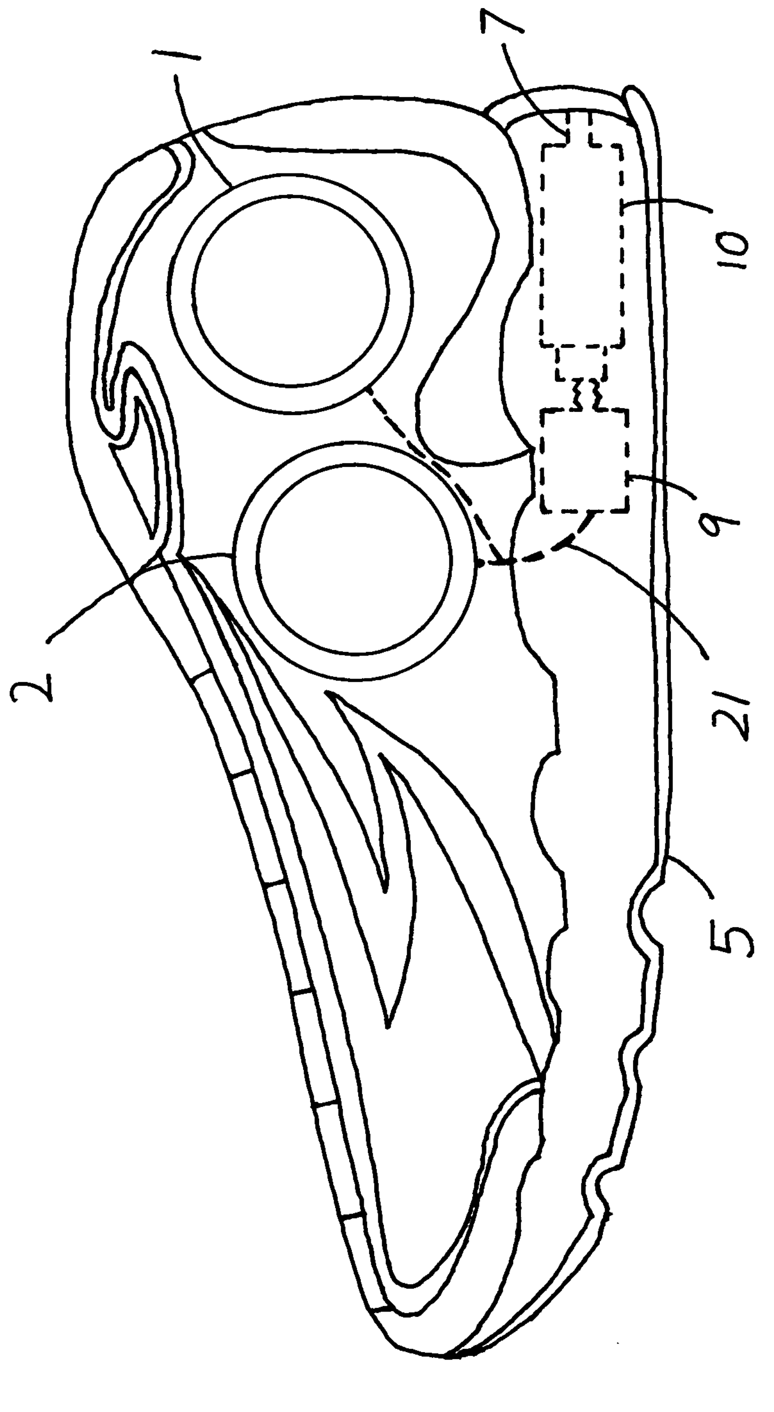
FIG. 1 is a side view of the outer side of an athletic shoe showing mini-speaker positions and a hidden battery and audio adapter receiver compartment.
Figure 2:
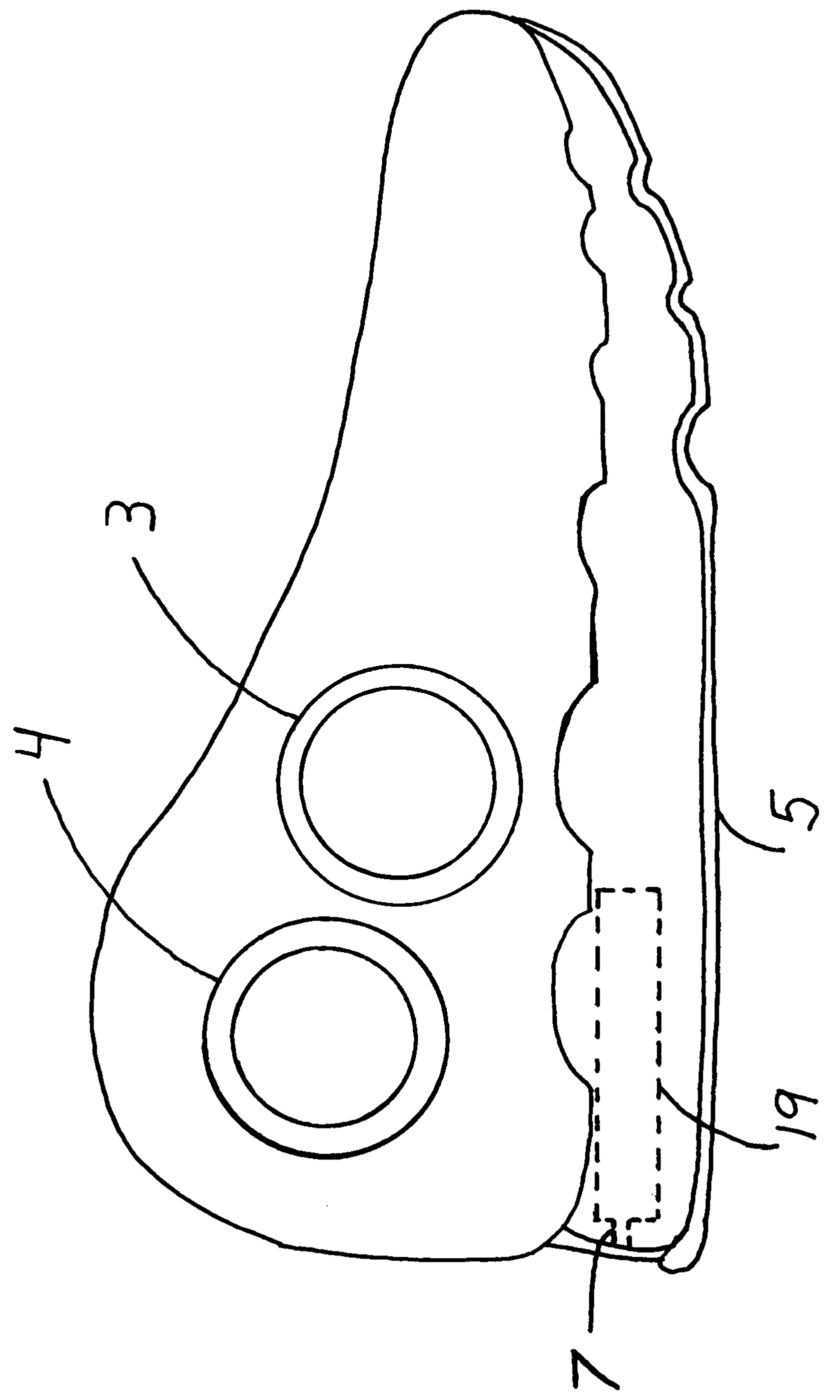
FIG. 2 is a side view of the inner side of the shoe of FIG. 1 showing more mini-speaker positions and a hidden compartment in the shoe's sole.
Figure 3:
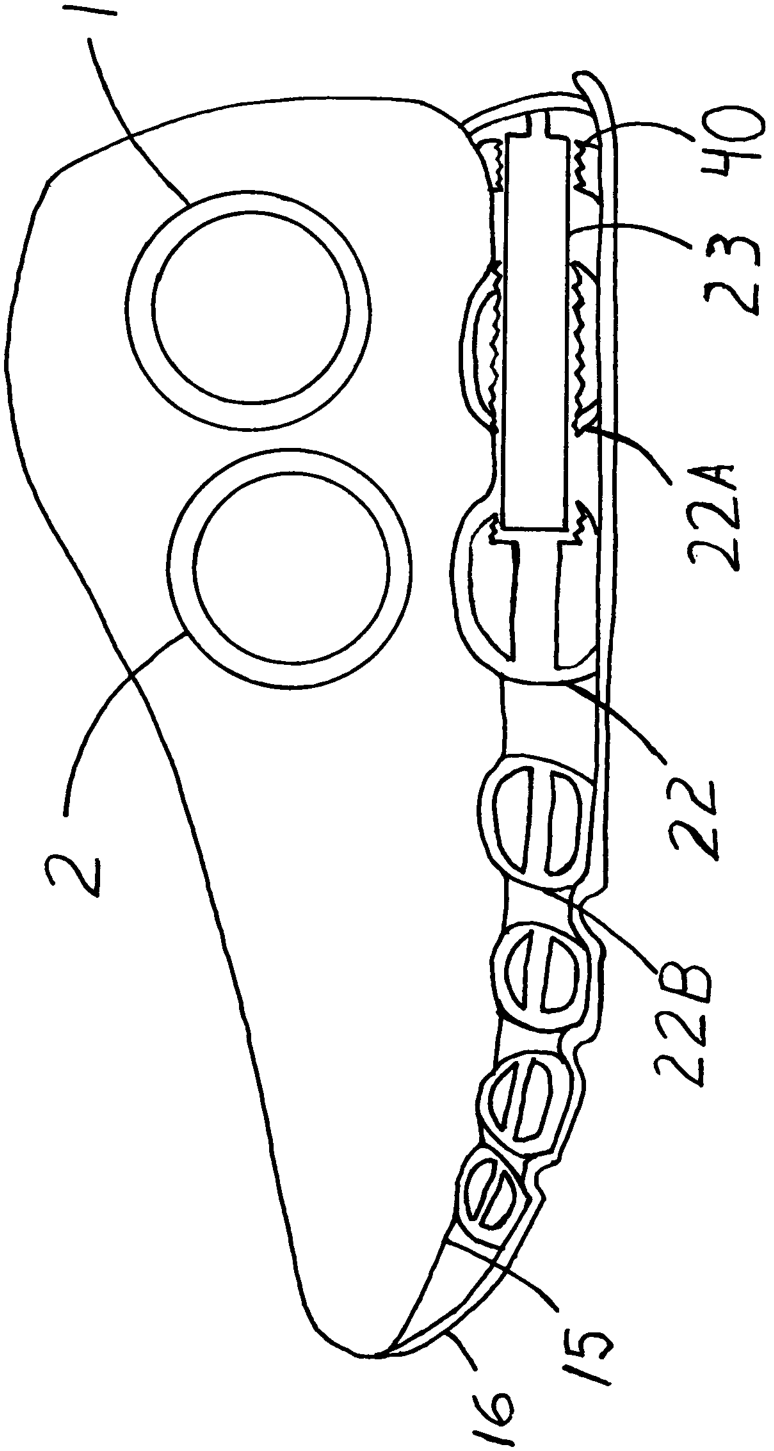
FIG. 3 is a side view of an alternate embodiment of a outer side of a spring cushioned shoe mounting an encapsulated capsule containing therein a battery source and an audio adapter receiver with some spring cushioned structure removed.
Figure 4:
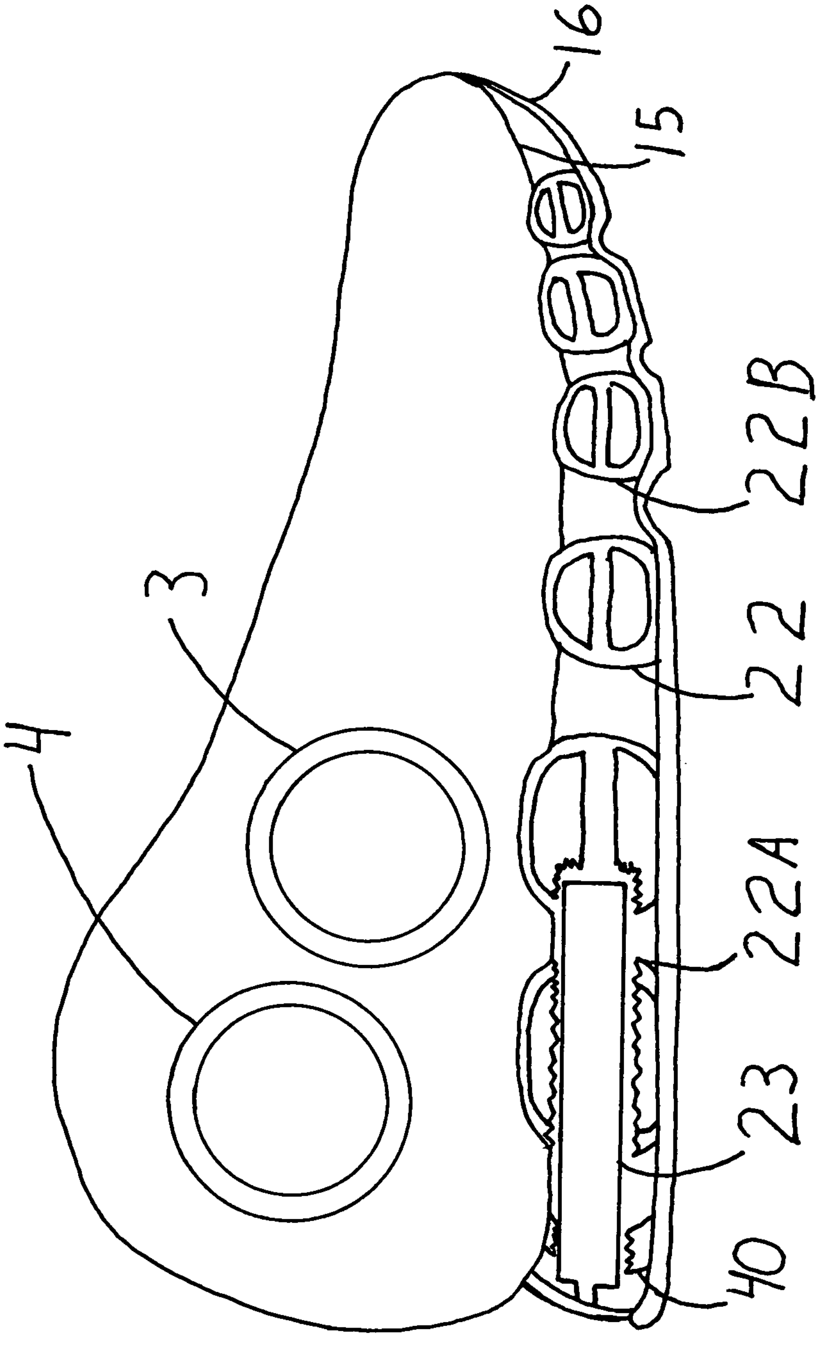
FIG. 4 is a side view of the inner side of the shoe of FIG. 3 with the spring cushion structure removed.

Referring to FIGS. 1 and 2, an article of footwear is depicted in the exemplary form of an athletic shoe. As shown, plural speakers 1 and 2 are positioned on or in the outer side of the shoe and plural speakers 3 and 4 are positioned on or in the inner side of the shoe. In a further embodiment not shown only one speaker may be mounted on each side of the shoe. In a yet further embodiment not shown plural speakers are mounted on each shoe pair. Other speaker positions not shown are the tongue of the shoe or rear wall portion encasing the wearer's heal or lateral quarter or the top wall of the shoe sometimes called the toe box covering the toes of the athlete. If desired the speaker's appearance may be camouflaged as for example by the design of a manufacturer's logo. Mini-speakers are a preferred type of speaker offering miniaturization advantages. Quality stereo music maybe heard using high definition speakers.

As shown in FIG. 2, the sole 5 is provided with a hidden compartment 19. Although not shown compartment 19 may be located in a lateral orientation. Also, the compartment 19 may be located in the front sole of the footwear or the back sole of the footwear. Compartment 19 also securely houses a wireless audio adapter receiver 9. A hidden speaker wiring harness connector 21 connects the audio adapter receiver with the speakers and may be permanently integrated within the shoe. If the shoe becomes worn out or damaged the battery power source 10 and the audio adapter receiver 9 may be salvaged by lifting up an inside footpad 15 and disconnecting the wiring harness from a wiring harness connecter port 25 located at one end of the audio adapter receiver 9.

Figure 9:
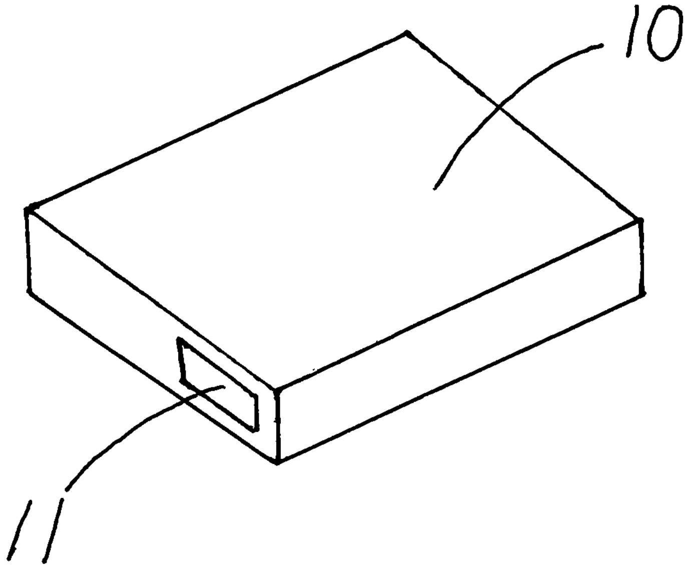
FIG. 9 is a perspective view of a battery power source showing a USB connector port for the audio adapter receiver.
Figure 10:
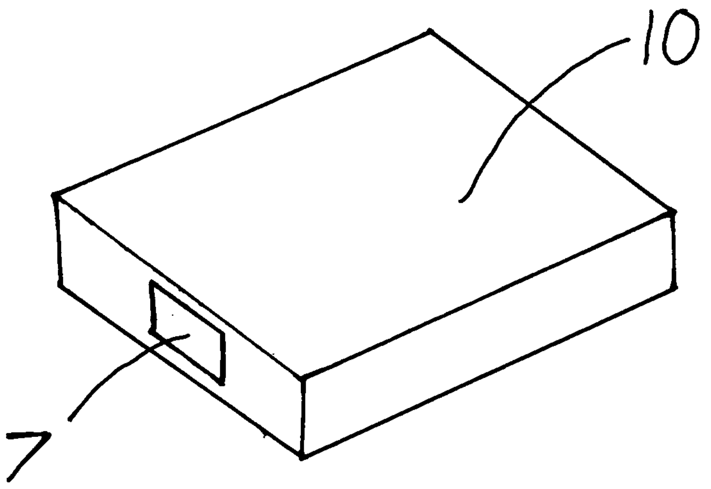
FIG. 10 is a reverse perspective view of the battery source of FIG. 9 showing a USB battery power access port.

A power battery source 10 shown in FIGS. 9 and 10 has a USB port connecter 11 for connection with an audio adapter receiver 9. A preferred type of battery power source offering extended music playing time is a rechargeable lithium-ion polymer battery pack. For example, a Kensington: Portable Power Pack may be used.

Figure 10B:
FIG. 10B is a side view of FIG. 10A.
Figure 10A:
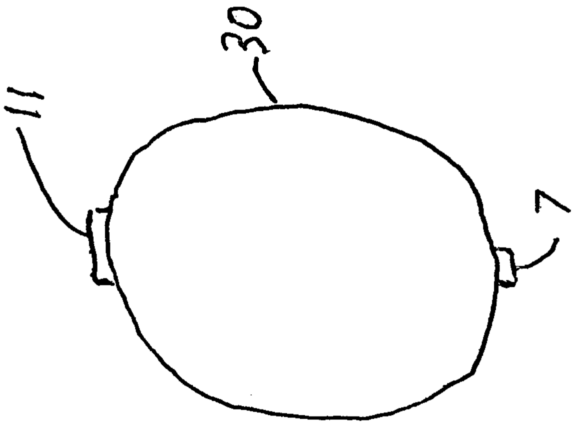
FIG. 10A is a top view of an alternate soft-shell lithium-ion polymer battery.

A alternative power battery source 30 is shown in FIG. 10A and FIG. 10B. Battery source 30 has the form of a rechargeable soft-shell lithium-ion polymer battery. The choice of shape varies. The shape need only permit fitting a thin and flexible battery encasement providing cushioned comfort below the inner sole of the shoe as contrasted with the hard-shell form of the Kensington Portable Power Pack shown in FIG. 10.

Figure 8:
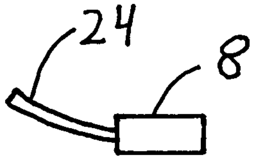
FIG. 8 is a rear view showing a cap and attaching tether for the FIG. 7 access charging port.
Figure 7:
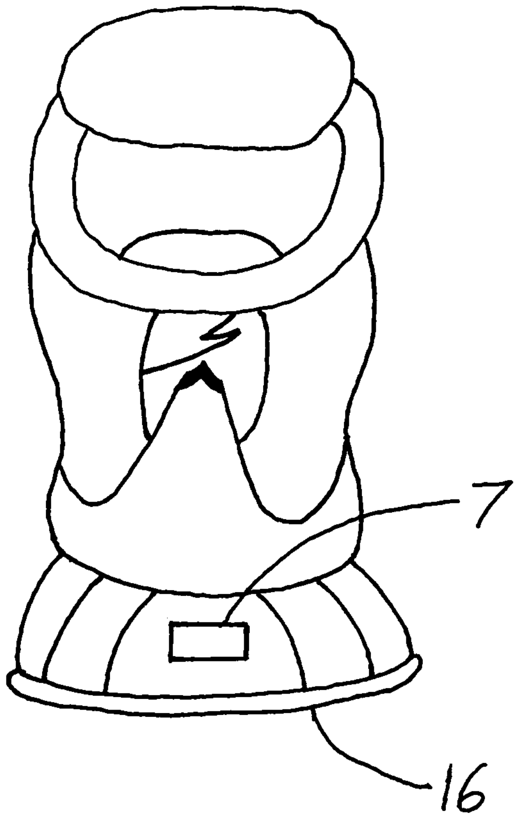
FIG. 7 is a view of the rear heel of the shoe of FIG. 1 showing a USB charging access port.

FIG. 7 depicts a rear heel USB power port 7 covered when not used by a waterproof cover 8. The cover 8 may be attached by tether 24 as shown in FIG. 8 or may be separate. Dirt and water is effectively blocked by cover 8. Provision of this port 7 facilitates recharging of the power battery source 10.

Figure 5A:
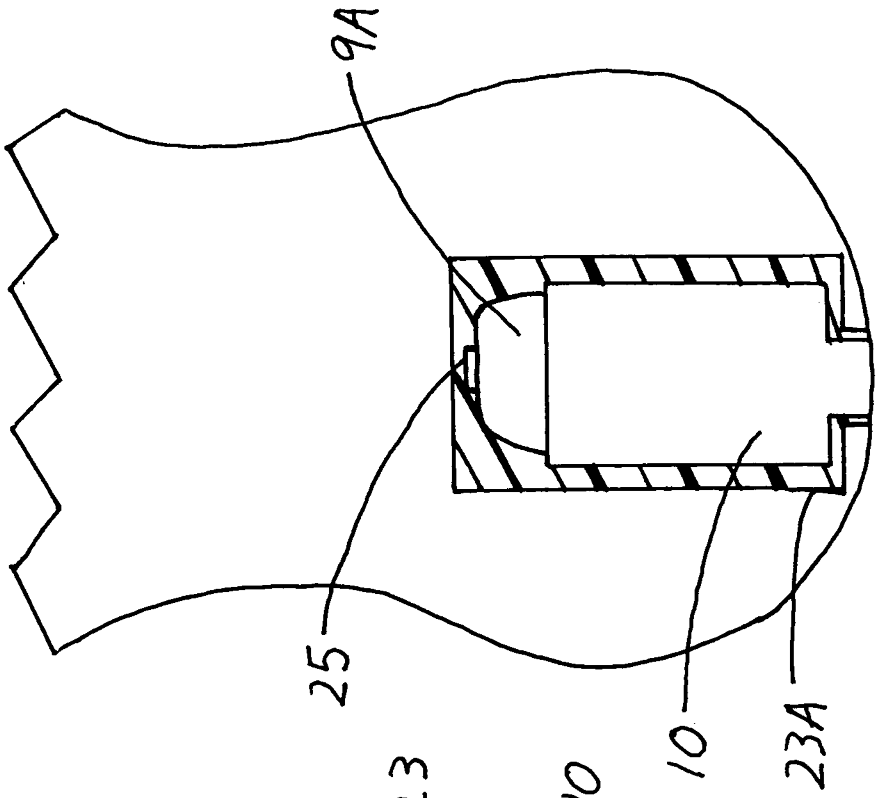
FIG. 5A shows an alternate embodiment having a shorter capsule than that of FIG. 5.
Figure 5:
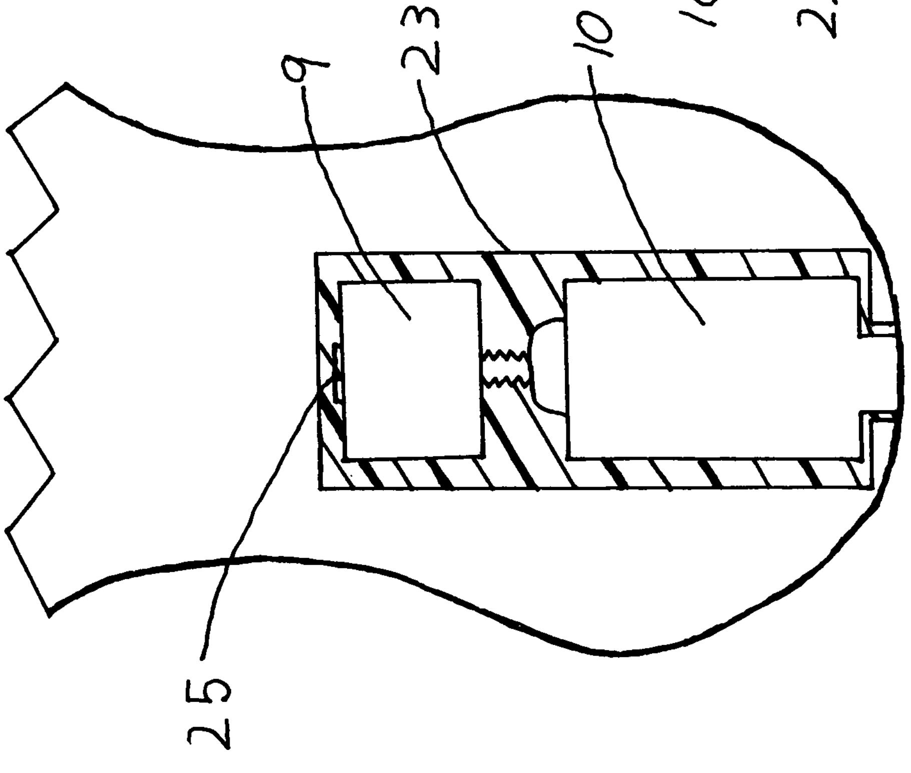
FIG. 5 is a partial bottom view with the sole bottom removed of the shoe of FIG. 3 showing placement of an encapsulated capsule.
Figure 6:
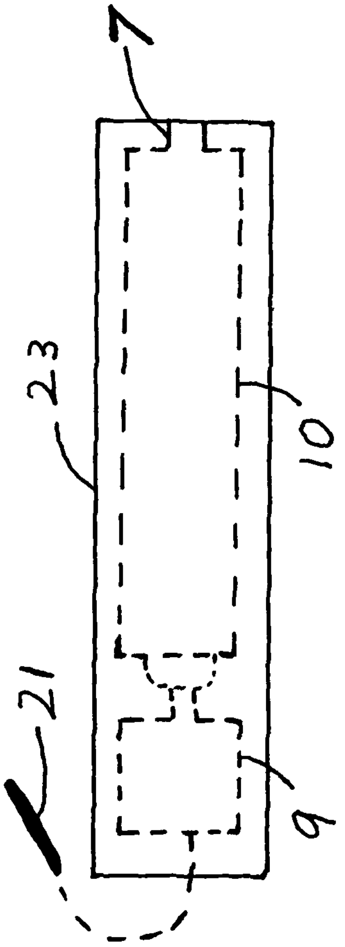
FIG. 6 is a side view of the capsule of FIG. 1 showing the encapsulation of the battery and audio adapter receiver.
Figure 6A:
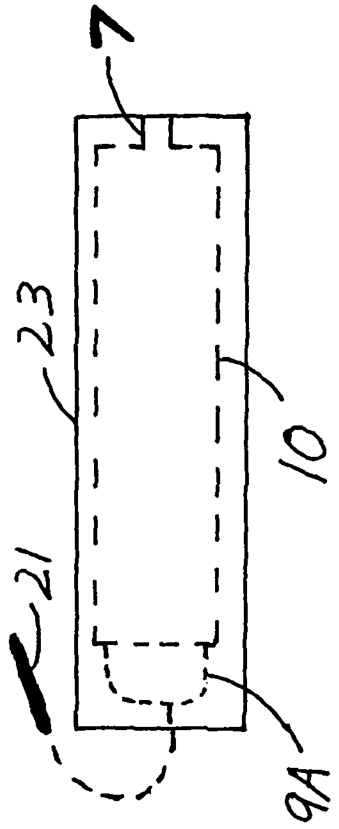
FIG. 6A is a side view similar to FIG. 6 showing an alternate smaller capsule.

FIG. 5 shows a battery source 10 connected with a audio-adapter receiver 9 encased by a rubberized polymer capsule 23 as shown in cross-section. FIG. 5A is similar to FIG. 5 but shows a more compact embodiment of a modular transmitter and receiver set. The audio-adapter receiver 9 and the audio-adapter transmitter 13 are best illustrated in both FIG. 5 and FIG. 11.

Figure 11:
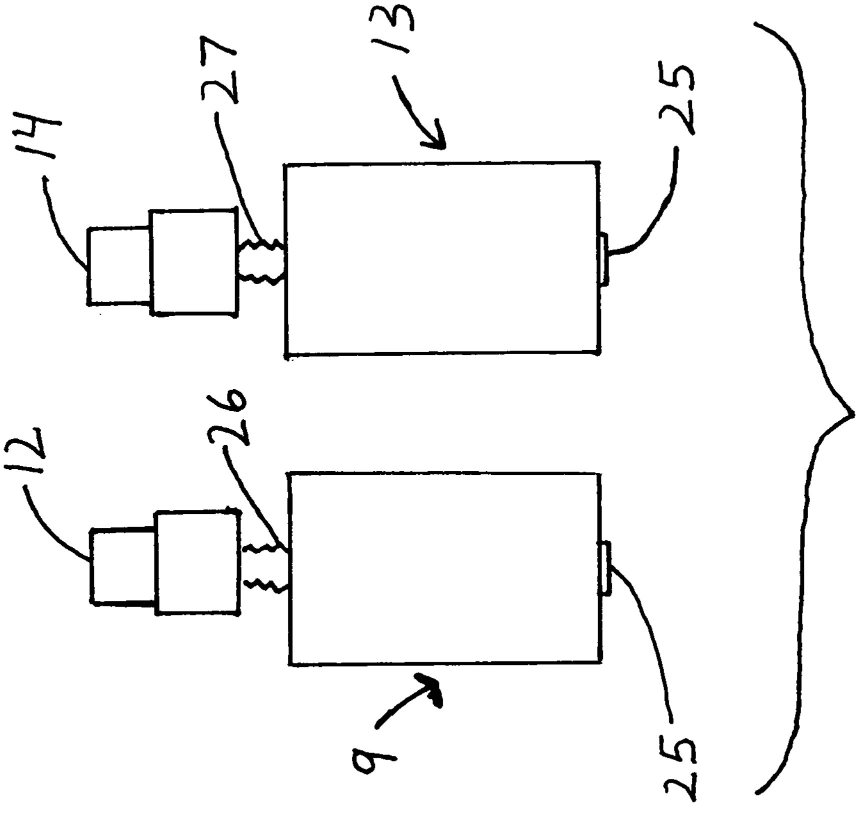
FIG. 11 shows one embodiment of an audio adapter transmitter-receiver set.

The FIG. 11 set shows an off the shelf system wherein the connecting portions 26 and 27 are made flexible for bending when the set is used with other hand-held devices and speakers. The preferred configuration of this set for the present invention would eliminate flexible connectors 26 and 27 as not needed. One set of a off the shelf audio-adapter transmitter 13 and audio-adapter receiver 9 suitable for use in a shoe is the Audioengine W1 (AW1) premium wireless audio-adapter system. This set can be used with any hand-held audio device to wirelessly transfer music to the shoe's speakers. The USB docking port 12 portion of receiver 9 is connected to a second portion having a USB docking port 25 at one end serving to transmit battery power to the speaker harness 21 along with the music signal received from transmitter 13 to the speakers.

Figure 12:
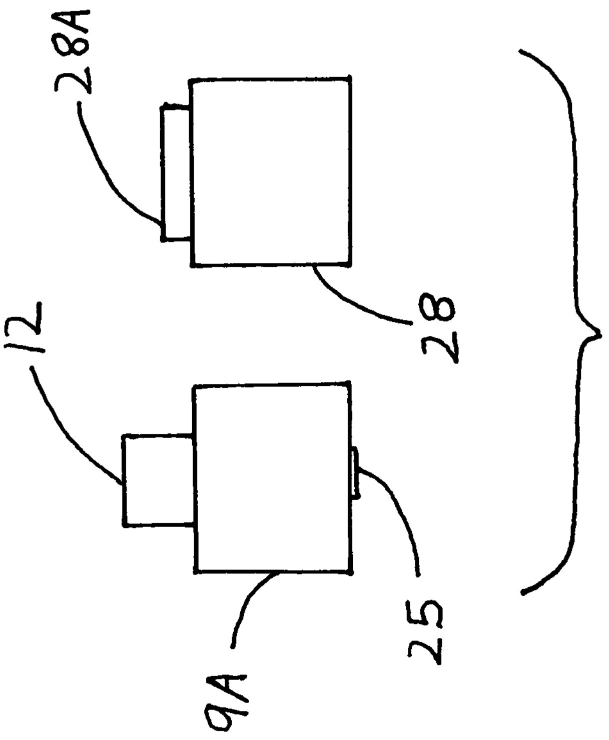
FIG. 12 shows an alternate smaller audio adapter transmitter-receiver set.

Audioengine also manufactures another premium set, the Audioengine AW2 wireless adapter set wherein the audio-adapter transmitter portion 28 docks with an iPhone or iPod. While the transmitter 28 may be used with the FIG. 11 audio-adapter receiver 9, a more preferable audio-adapter receiver 9A having a compact modular form is shown as part of the audio-adapter system in FIG. 5A and FIG. 12.

Both premium sets have a range up to 100 feet for effectively preventing static, noise, signal drop out and interference.

Figure 13:
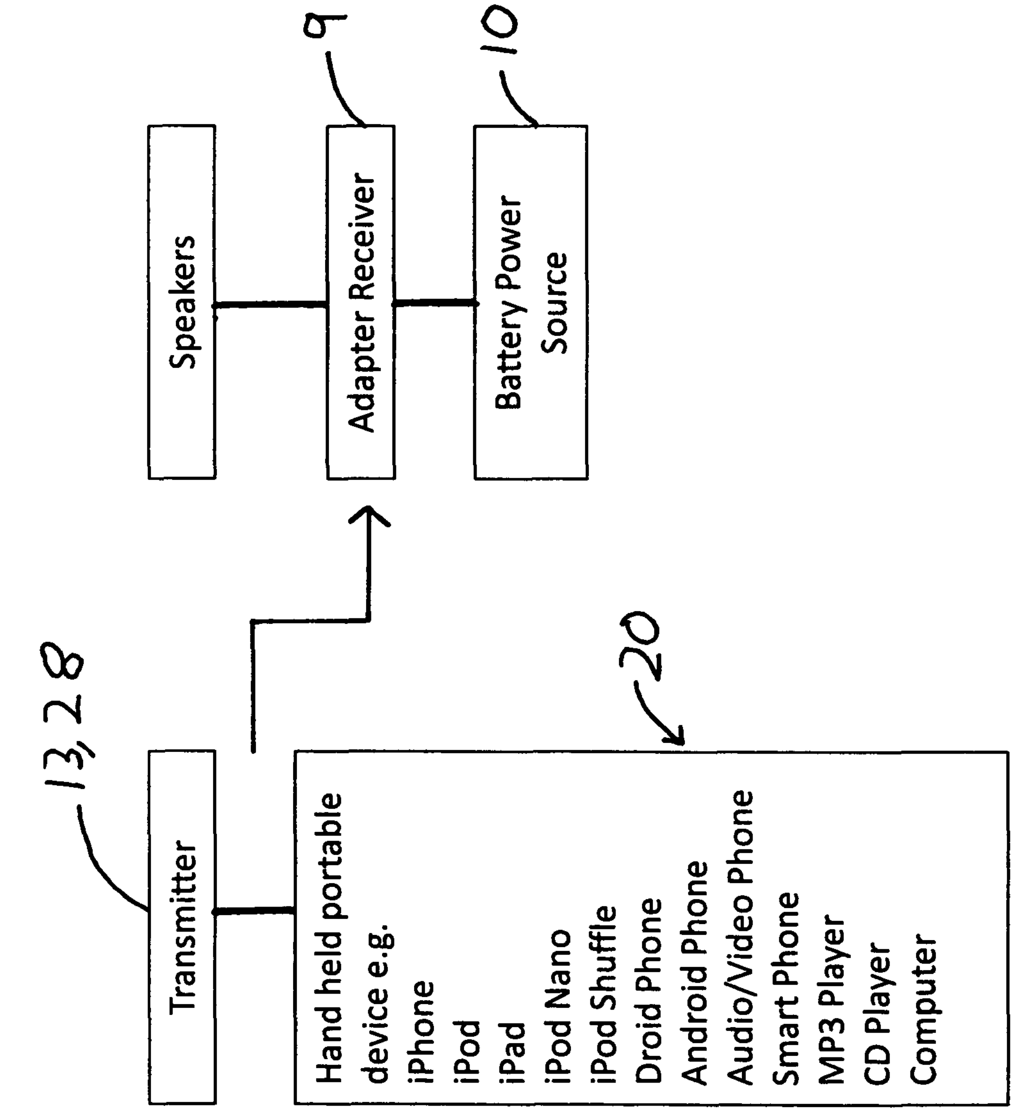
FIG. 13 is a logic diagram showing substantially a hand-held device in wireless communication with the mini-speakers shown in FIGS. 1-4.

Referring to the logic diagram of FIG. 13, a hand held device 20 serves as a music source external to the footwear. The wireless audio adapter transmitters 13, 28 interface with the hand-held device 20 to wirelessly transmit music signals to the audio adapter receivers 9 and 9A which interface with the battery pack 10 through the previously identified wiring harness 21 connecting the mini-speakers 1-4. As shown in FIG. 13, the hand held device may as an example be an iPod, iPhone, iPad, iPad 3G, iPod nano, iPod Shuffle, iPod Touch, iPad Tablet, smart phone, Droid phone, Android phone, MP3 player, CD player, microchip player or computer.

In another embodiment not shown, a shoe pair with both shoes having speakers, independent battery power packs and wireless audio adapter receivers achieves louder volume using up to four speakers per shoe from a single signal hand-held music source.

The present invention lends itself to various musical applications. Examples are: karaoke games or receiving dancing music along with dancing instructions played through the speakers in the shoes. Another example recently unveiled is the iPhone 4 video calling device having digital two-way communication capabilities which make it possible for the users to speak or sing through the speaker shoe system of the present invention.

While particular embodiments of the Speakz™ system for speaker footwear have been described herein, it will be appreciated by those skilled in the art that changes and modifications may be made thereto without departing from the invention in its broader aspects.

What is claimed is:

1. A method of wirelessly playing high definition digital stereo music using footwear mounted high definition digital stereo mini-speakers on or in each of a first and second footwear of a pair comprising the steps of:

wearing the pair while playing the music;

mounting at least one high definition mini-speaker on or in each of a first and second footwear of the pair;

providing at least one compartment below or in the inner soles of each footwear;

placing a rechargeable lithium-ion battery pack in each compartment;

using as the battery pack a soft shell thin and flexible form to provide cushioned comfort to the wearer beneath or in the inner sole of the footwear;

providing an USB power access port integral with the battery pack facilitating recharging of the battery pack;

providing a digital stereo music source easily worn or hand held by the wearer of the footwear which music source is powered by a battery external to the battery pack of the footwear;

providing an audio adapter system comprising a single audio adapter transmitter and a first and second audio adapter receiver wirelessly compatible with the audio adapter transmitter for receiving independently by each audio adapter receiver a high definition stereo signal from the audio transmitter adapter;

providing the transmitter in a modular form easily connected and disconnected to different types of hand held or worn music sources;

connecting the first audio adapter receiver directly to the battery pack of the first footwear and to the at least one mini-speaker of the first footwear;

connecting the second audio adapter receiver directly to the battery pack of the second footwear and to the at least one mini-speaker of the second footwear;

encasing each of the first and second audio receivers in rubberized polymer capsules located in compartments below or in the inner sole of each footwear to provide additional cushioned comfort to the wearer of the footwear;

powering the audio adapter transmitter solely by directly connecting the transmitter to the battery of the external source.

2. The method of claim 1 further comprising the step of providing the USB power access port in the sole or heal of each footwear to permit in situ charging of the battery pack of each footwear.

3. The method of claim 1 further comprising the step of selecting an external music source from a group of portable devices comprising a pocket sized music player, a tablet computer music player, a smart phone, a music player that supports MP3 format, a compact disc player, a microchip player or a computer.

4. The method of claim 1 further comprising the step of using premium quality audio adapter receivers for the first and second audio adapter receivers and the further step of having the audible sounds of high definition music emanate from the mini-speakers to a range of 100 feet.

5. The method of claim 1 comprising the further step of providing each audio adapter receiver with a USB docking port for docking with a wiring harness connecting at least one mini-speaker of each pair comprising the footwear with the battery pack of each footwear.

6. A wireless high definition stereo music system for a pair of footwear comprising:

a digital stereo music source easily worn or hand held by the wearer of the footwear which music source is powered by a battery to allow the music source to provide high definition stereo audio output;

a pair of first and second footwear having at least one high definition mini-speaker mounted in or on each footwear of the pair;

each footwear having at least one compartment in or below the inner sole of the footwear;

at least one compartment having therein a rechargeable lithium-ion battery pack wherein the battery pack is of a soft shell thin and flexible form to provide cushioned comfort to the wearer of the footwear;

each battery pack having integral therewith a USB power access port facilitating in situ recharging of the battery pack;

each battery pack being in direct contact with at last one mini-speaker of each footwear;

an easily connected and disconnected premium audio adapter transmitter pluggable into the music source which wirelessly transmits music from the music source a short range to the area of the feet of the footwear worn by the wearer which transmitter is compatible with multiple types of hand held or worn music sources and is powered solely by the battery of the music source;

an audio adapter receiver module compatible with the transmitter and mounted in at least one of the compartments of each footwear;

each audio adapter receiver module being encased in a rubberized polymer capsule as a protective measure against the elements and to provide further cushioning comfort to the footwear wearer;

wherein the audio adapter transmitter sends wireless digital high definition music signals independently to each of the second audio adapter receiver modules to thereby create a stereo sound by the mini-speakers.

7. The wireless high definition stereo music system of claim 6 wherein a USB power access port is located in the heel of each footwear to provide in situ charging of the battery packs.

8. The wireless high definition stereo music system of claim 6 wherein each audio adapter receiver module is adapted to receive music wirelessly from the music source chosen from the group of portable devices comprising a pocket sized music player, a tablet computer music player, a smart phone, a music player that supports MP3 format, a compact disc player, a microchip player or a computer.

9. The wireless high definition stereo music system of claim 6 wherein each audio adapter receiver module has an USB docking port which docks with a wiring harness connected to the battery pack of the respective footwear.

10. The wireless high definition stereo music system of claim 6 wherein each audio adapter receiver module is a premium quality audio adapter receiver module directly connected to at least one min-speaker of each footwear pair to enable audible high definition stereo music to emanate from the mini-speakers to a range of 100 feet.

11. A wireless high definition stereo music system for a pair of footwear comprising:

a digital stereo music source easily worn or hand held by the wearer of the footwear which music source is powered by a battery to allow the music source to provide high definition stereo audio output;

a pair of first and second footwear having at least one high definition mini-speaker mounted in or on each footwear of the pair;

each footwear having at least one compartment in or below the inner sole of the footwear;

at least one compartment having therein a rechargeable battery pack;

each battery pack having integral therewith a USB power access port facilitating in situ recharging of the battery pack;

each battery pack being in direct contact with at least one mini-speaker of each footwear;

an easily connected and disconnected premium audio adapter transmitter pluggable into the music source which wirelessly transmits music signals from the music source a short range to the area of the feet of the footwear worn by the wearer which transmitter is compatible with multiple types of hand held or worn music sources and is powered solely by the battery of the music source;

an audio adapter receiver module compatible with the transmitter and mounted in at least one the compartments of each footwear;

each audio adapter receiver module being encased in a rubberized polymer capsule as a protective measure against the elements and to provide cushioning comfort to the footwear wearer;

wherein the audio transmitter sends wireless digital high definition music signals independently to each of the audio adapter receiver modules to thereby create a stereo sound by the mini-speakers.

12. The wireless high definition stereo music system of claim 11 wherein each audio adapter receiver module is adapted to receive music wirelessly from the music source chosen from the group of portable devices comprising a pocket sized music player, a tablet music player, a smart phone, a music player that supports MP3 format, a compact disc player, a microchip player or a computer.

* * * * *